US008321367B2

(12) United States Patent
Nishida

(10) Patent No.: US 8,321,367 B2
(45) Date of Patent: Nov. 27, 2012

(54) DATA PROCESSING APPARATUS, METHOD, AND COMPUTER PROGRAM PRODUCT FOR USER OBJECTIVE PREDICTION

(75) Inventor: Hirobumi Nishida, Kanagawa (JP)

(73) Assignee: Ricoh Company. Ltd., Tokyo (JP)

( * ) Notice: Subject to any disclaimer, the term of this patent is extended or adjusted under 35 U.S.C. 154(b) by 926 days.

(21) Appl. No.: 12/382,407

(22) Filed: Mar. 16, 2009

(65) Prior Publication Data
US 2009/0234793 A1 Sep. 17, 2009

(30) Foreign Application Priority Data
Mar. 17, 2008 (JP) .................................. 2008-067481

(51) Int. Cl.
G06F 9/44 (2006.01)
(52) U.S. Cl. ............................ 706/52; 382/159; 382/190
(58) Field of Classification Search .................... 706/52; 382/159, 190
See application file for complete search history.

(56) References Cited

U.S. PATENT DOCUMENTS
| 6,834,124 | B1 * | 12/2004 | Lin et al. | 382/261 |
| 2002/0169735 | A1 * | 11/2002 | Kil et al. | 706/46 |
| 2005/0174589 | A1 * | 8/2005 | Tokiwa | 358/1.9 |

FOREIGN PATENT DOCUMENTS
| JP | 6-4704 | 1/1994 |
| JP | 6-20092 | 1/1994 |
| JP | 2006-053690 | 2/2006 |
| JP | 2006-074331 | 3/2006 |
| JP | 2007-018300 | 1/2007 |
| JP | 2009-95001 | 4/2009 |

\* cited by examiner

Primary Examiner — Kakali Chaki
Assistant Examiner — Mai T Tran
(74) Attorney, Agent, or Firm — Harness, Dickey & Pierce, P.L.C.

(57) ABSTRACT

A data processing apparatus includes an input unit that receives input data, a calculating unit that calculates a feature vector, a selection receiving unit that presents processing options to a user and receives a user selection, a storing unit stores processing history information, and a predictor constructing unit that constructs a predictor for an identifying algorithm that predicts optimal processing for input data based on processing history information stored in a history database. An optimal function predicting unit predicts optimal processing based on a feature vector calculated for new data by using the predictor and an evaluating unit evaluates work efficiency for the predicted optimal processing, wherein the evaluating unit is configured to evaluate work efficiency for the optimal processing based on a prediction accuracy of the predictor and a user specific working time that is required for each user to select one of the processing options with the selection receiving unit. Finally, a presenting unit presents the optimal processing to a user when an evaluation result obtained by the evaluating unit is equal to or greater than a threshold.

17 Claims, 10 Drawing Sheets

DATA PROCESSING APPARATUS, METHOD, AND COMPUTER PROGRAM PRODUCT FOR USER OBJECTIVE PREDICTION

CROSS-REFERENCE TO RELATED APPLICATIONS

The present application claims priority to and incorporates by reference the entire contents of Japanese priority document 2008-067481 filed in Japan on Mar. 17, 2008.

BACKGROUND OF THE INVENTION

1. Field of the Invention

The present invention relates to a data processing apparatus, a data processing method, and a computer program product for implementing the same.

2. Description of the Related Art

In recent years, with growing popularity of color scanners and digital cameras, the probability of scanning color documents and processing color image data has increased. Such processing includes, storing, printing, and reusing color image data. Sometimes the color image data is even transmitted to some other device via a network.

Image data is used in various ways depending on the needs. Moreover, image data have various types. These facts make fabrication of a system that can handle the image data optimally difficult.

To address this problem, a data processing apparatus is disclosed, that deals with "diversity" of input devices and applications (user tasks) in, for example, Japanese Patent Application Laid-open No. 2006-053690 and Japanese Patent Application Laid-open No. 2006-074331.

"Objectives" of users are another important factor that has to be considered in terms of "diversity." That is, even when processing similar document images, different user's objectives require different processing or parameters to be applied. For example, in a document image tone correcting technology, a determination as to whether skin colors are to be changed to white (skin color correction) or only contaminations and offset stains are to be removed while preserving original colors (skin color cleaning) depends on user's objectives.

In conventional data processing systems, when a large number of images are to be processed depending on individual user's objectives in such a manner, a user needs to specify an algorithm or a processing parameter for each sheet of paper one by one. This puts a lot of burden on the user and reduced work efficiency.

To construct a system that can accommodate such "diversity", a mechanism is required to be built that performs operations described below on site, that is, on a device in operation.

(1) Storing history and (an) event(s) that record a set of a multi-dimensional feature vector representing data content and an algorithm or a processing parameter applied by the user.

(2) Using the stored history and event(s) to learn a function that predicts based on each feature vector how appropriate the algorithm or processing parameter is.

(3) Predicting what should be done (appropriate algorithm or processing parameter to be applied) to unknown data based on the feature vector of the data.

Therefore, constructing the system that can accommodate "diversity" requires a function to, based on the history information and the event(s) (a list including each set of the feature vector representing data content and the applied process and the used parameter), recommend appropriate processing or function(s) (an algorithm or a parameter). For data similar to data previously processed, such a recommending function recommends the same processing to the user as that applied to the previously processed similar data. The user may specify an alternative algorithm or parameter only when the user does not accept those recommended. In this manner, a desirable system learns over time to initially (by default) select an algorithm or a parameter that meets requirements.

Therefore, the present applicant has proposed a method for realizing such a mechanism in Japanese Patent Application No. 2007-18300 and Japanese Patent Application No. 2007-242682.

However, even if a mechanism for providing recommendation to a user can be realized, with insufficient learning of a predictor and thus low prediction accuracy, the user is required to modify the recommendation one by one. Due to the modification, work efficiency may be worse than a system without such recommendation.

Therefore, the prediction for recommendation should be performed as long as the prediction accuracy is high enough to improve the work efficiency by the recommendation.

Note that, because the work efficiency depends not only on the accuracy of the predictor but also on working speed specific to each user, it is not sufficient simply to threshold the predicting accuracy calculated based on the history.

SUMMARY OF THE INVENTION

It is an object of the present invention to at least partially solve the problems in the conventional technology.

According to an aspect of the present invention, there is provided a data processing apparatus including an input unit configured to receive input of data; a calculating unit configured to calculate a feature vector of data input through the input unit; a selection receiving unit configured to present processing options to a user and receives a user selection from the processing options; a storing unit configured to store processing history information in a history database, the processing history information including feature vectors calculated by the calculating unit and user selections received via the selection receiving unit in a time series manner; a predictor constructing unit configured to construct a predictor for an identifying algorithm that predicts optimal processing for input data based on processing history information stored in a history database; an optimal function predicting unit configured to predict optimal processing based on a feature vector calculated by the calculating unit of new data input via the input unit by using the predictor; an evaluating unit configured to evaluate work efficiency for the optimal processing predicted by the optimal function predicting unit, wherein the evaluating unit is configured to evaluate work efficiency for the optimal processing predicted by the optimal function predicting unit based on a prediction accuracy of the predictor and a user specific working time that is required for each user to select one of the processing options with the selection receiving unit; and a presenting unit configured to present the optimal processing predicted by the optimal function predicting unit to the user when an evaluation result obtained by the evaluating unit is equal to or greater than a threshold.

According to another aspect of the present invention, there is provided a data processing method including receiving input of data; calculating a feature vector of data received at the receiving; selection receiving including presenting processing options to a user and receiving a user selection from the processing options; storing processing history information in a history database, the processing history information including feature vectors calculated by the calculating unit and user selections received via the selection receiving in a time series manner; constructing a predictor for an identifying algorithm that predicts optimal processing for input data based on processing history information stored in a history database; predicting optimal processing based on a feature vector calculated at the calculating of new data received at receiving by using the predictor; evaluating work efficiency for the optimal processing predicted at the predicting, wherein the evaluating includes evaluating work efficiency for the optimal processing predicted at the predicting based on a prediction accuracy of the predictor and a user specific working time that is required for each user to select one of the processing options at the selection receiving; and presenting the optimal processing predicted at the predicting to the user when an evaluation result obtained at the evaluating is equal to or greater than a threshold According to still another aspect of the present invention, there is provided a computer program product having a computer readable storage medium including a plurality of computer executable instructions for performing data processing, the instructions causing a computer to execute the above data processing method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention will be described in detail below with reference to the accompanying drawings.

Figure 1:
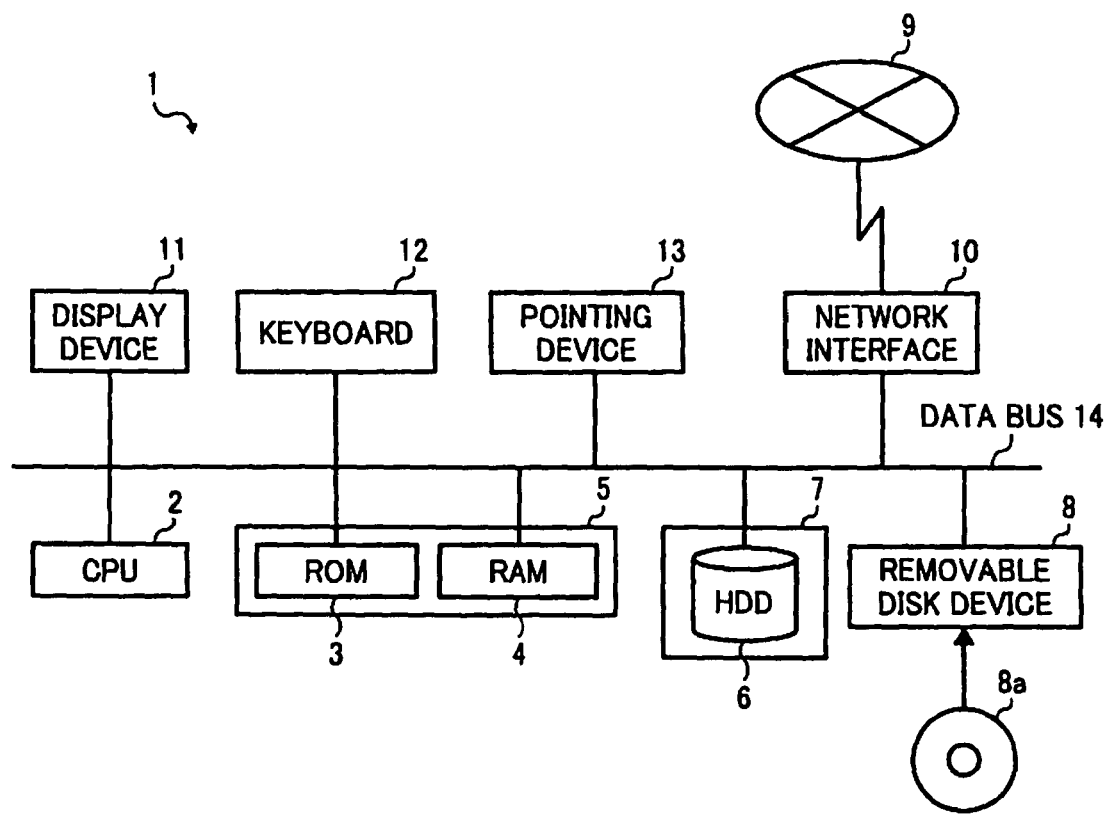
FIG. 1 is a block diagram of hardware configuration of a data processing apparatus according to a first embodiment of the present invention.

A first embodiment of the present invention will be described based on FIGS. 1 to 8. FIG. 1 is a block diagram of a data processing apparatus 1 according to the first embodiment. The data processing apparatus 1 is a computer such as a personal computer (PC). The data processing apparatus 1 includes a central processing unit (CPU) 2 that is a controlling unit that centrally controls each unit in the data processing apparatus 1; primary storages 5, such as a read only memory (ROM) 3 and a random access memory (RAM) 4, that store therein information; a secondary storage 7, such as a hard disk drive (HDD) 6, that stores therein data files (for example, color bit map image data); a removable disk device 8, such as a CD-ROM drive, that archives information, distributes information to outside, and acquires information from outside; a network interface 10 that communicates information with other external computer(s) via a network 9; a display device 11, such as a cathode ray tube (CRT) or a liquid crystal display (LCD), that displays processing status and results to an operator; a keyboard 12 for enabling the operator to input instructions, information, and the like to the CPU 2; and a pointing device 13 such as a mouse. A bus controller 14 operates to coordinate data that is received from or transmitted to each of these components.

Note that, while, in the present embodiment, a general personal computer is described and applied as the data processing apparatus 1, the data processing apparatus 1 is not limited thereto, but may be a portable information terminal referred to as a personal digital assistant (PDA), or a palmtop PC, a mobile phone, a personal handy-phone system (PHS), or the like.

When a user turns on the power of the data processing apparatus 1, the CPU 2 activates a computer program called a loader in the ROM 3. The CPU 2 then reads an operating system, namely, a computer program that manages hardware and software in the computer, from the HDD 6 to the RAM 4 to activate the operating system. The operating system activates a computer program based on a user operation, reads in information, stores information, and so on. As typical operating systems, Windows (registered mark) and UNIX (registered mark) are known, for example. Operation programs run on these operating systems is referred to as application programs.

A data processing program is stored beforehand in the HDD 6 as an application program. In this sense, the HDD 6 acts as a storage medium that stores therein the data processing program.

In general, the application program to be installed in the secondary storage 7, such as the HDD 6, comes in the form of a computer program recorded in a storage medium 8a. The storage medium 8a can be an optical information storing medium such as a CD-ROM, a DVD-ROM, or a magnetic medium such as a floppy disk. The application program stored in the storage medium 8a is then installed in the secondary storage 7 such as the HDD 6. Alternatively, the data processing program can be stored in the storage medium 8a that is portable. Alternatively, the data processing program can be stored in a computer that is connected to the data processing apparatus 1 via a network, such as the Internet, and can be downloaded from that computer program in the data processing apparatus 1. The data processing apparatus 1 can be connected to the network via the network interface 10. The downloaded computer program can be stored in the secondary storage 7. The data processing program can also be distributed to other devices connected to the data processing apparatus 1 via the network.

When the data processing program is activated, the data processing apparatus 1 centrally controls each component with the CPU 2 performing various operations according to the contents of the data processing program.

Note that, when a real time operation is important, processing has to be fast. To do so, it is desirable for providing logic circuits (not shown) to perform each operation by operations of the logic circuits.

Among various operations that are performed by the CPU 2 in the data processing apparatus 1, the data processing characterizing the present embodiment will be described below.

Figure 2:
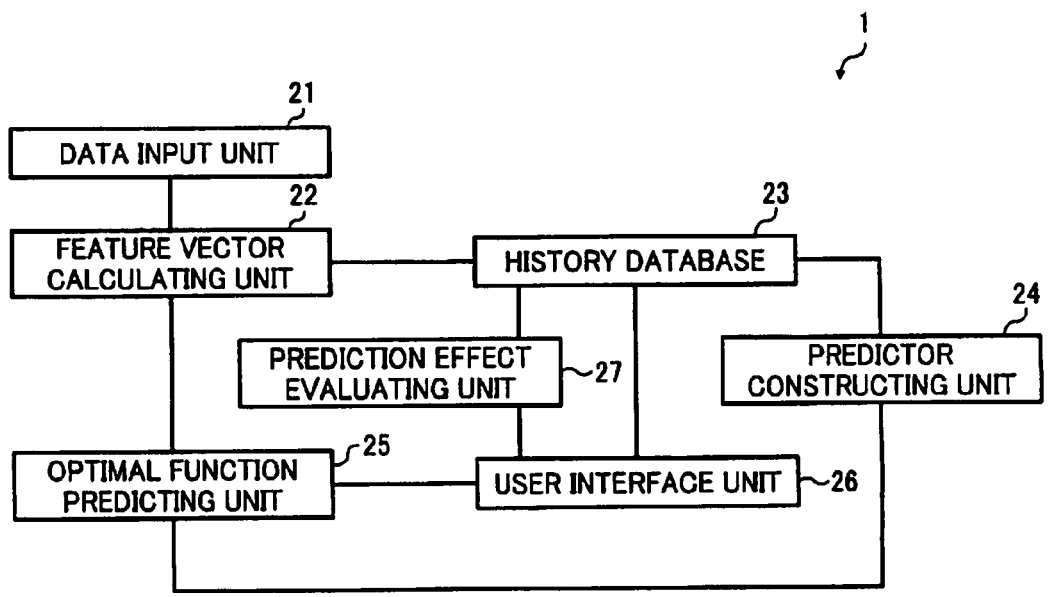
FIG. 2 is a functional block diagram of functions related to data processing in the data processing apparatus shown in FIG. 1.

FIG. 2 is a functional block diagram of functions related to data processing performed by the CPU 2 in the data processing apparatus 1. As shown in FIG. 2, the data processing apparatus 1 includes a data input unit 21 that receives data input, a feature vector calculating unit 22 that calculates a feature vector of the input data, a history database 23, a predictor constructing unit 24 that constructs a predictor, an optimal function predicting unit 25 that predicts an optimal function, a user interface unit 26 that receives and presents a selection(s), and a prediction effect evaluating unit 27 that evaluates a prediction effect. Operations and effects of each of these components will be described in detail below.

Figure 3:
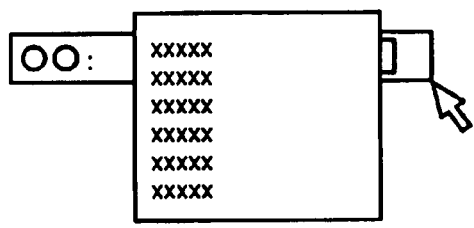
FIG. 3 is an example of a pull down menu.

The user interface unit 26 presents a menu through which a user can select a processing (such as an algorithm or a parameter) to be applied to data on the display device 11, and prompts the user to select a processing. As a menu presented on the display device 11 by the user interface unit 26 according to the present embodiment, a pull down menu 100 shown in FIG. 3 is prepared. The present embodiment illustrates a menu selecting task such that a user selects and specifies one of the items listed in the pull down menu 100 to be applied to data by using the pointing device 13 such as a mouse. Note that, in the present embodiment, M pull down menus 100 are prepared.

The data input unit 21 receives data input and preprocesses the input data. When the input data is a document image, for example, the data input unit 21 applies "skew correction" or the like to correct a skew in a document in the input document image.

The feature vector calculating unit 22 receives as an input the data output from the data input unit 21 and calculates a feature vector. Then, the feature vector calculating unit 22 outputs the calculated feature vector to the history database 23 and the optimal function predicting unit 25. When the data is text data, for example, "Bag-Of-Words", that is, a vector that describes how frequently a word appears in a document can be used. When the data is a document image, for example, a vector that describes features in the document image can be combined, as disclosed, for example, in Japanese Patent No. 3253356 and Japanese Patent No. 3215163. In addition, statistical data that can be obtained from color or luminance distribution, or edge intensity distribution, or the like can be used.

The history database 23 is formed in the HDD 6 and stores therein processing history information that includes the feature vector output from the feature vector calculating unit 22 and an algorithm or a processing parameter selected by the user through a menu displayed on and output from the user interface unit 26. The processing history information H stored in the history database 23 is expressed as below:

$$H=\{(x(1),\alpha 1(1),\ldots,\alpha M(1)),(x(2),\alpha 1(2)),\ldots,\alpha M(2)),\ldots\}$$

where $x(k)$ is the feature vector extracted from kth piece of data, and $\alpha j(k)$ is an algorithm or a processing parameter selected from jth menu. In the history database 23, these are recorded in time series. When nothing is selected from the jth menu, a value representing a missing value can be inserted.

The predictor constructing unit 24 constructs predictors by learning with data stored in the history database 23. The predictor constructing unit 24 in the present embodiment constructs M predictors by learning in conjunction with an identifying algorithm used in the optimal function predicting unit 25, where M corresponds to the number M of the pull down menus 100 prepared by the user interface unit 26.

The optimal function predicting unit 25 receives as an input the feature vector output from the feature vector calculating unit 22 and predicts an optimal function (an algorithm or a processing parameter) by using M predictors constructed in the predictor constructing unit 24. The optimal function predicting unit 25 can supply the feature vector output from the feature vector calculating unit 22 to the predictors that use any identifying algorithm and output a class (that corresponds to an algorithm or a processing parameter) to be recommended as a function (processing) predicted as optimal. The identifying algorithm includes, for example, the nearest identification, a neural network, and a support vector machine.

Figure 4:
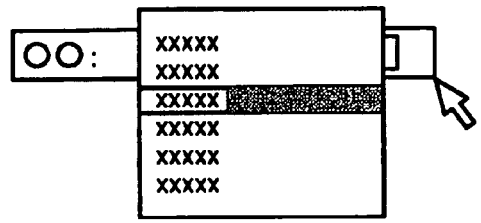
FIG. 4 is an example of highlighting an item in the pull down menu shown in FIG. 3.

When the optimal function predicting unit 25 outputs the function (processing) predicted as optimal, the user interface unit 26 presents, as shown in FIG. 4, an item corresponding to an algorithm or a parameter that is predicted as optimal to a user with the item being highlighted or otherwise being emphasized on the pull down menu 100. A user indicates whether he/she accepts the function (processing) predicted as optimal by using the pointing device 13 such as a mouse. For example, if a user does not accept the function (processing) predicted as optimal, he/she can reselect other processing or parameter from the menu by using the pointing device 13 such as a mouse. The user response result is output from the user interface unit 26 to the history database 23 and the prediction effect evaluating unit 27.

The prediction effect evaluating unit 27 introduces an evaluation index for prediction effect in terms of user work efficiency when a user selects an operation or a function to be applied to the data from the pull down menu 100 as described above.

Because the work efficiency depends not only on accuracy of M predictors constructed in the predictor constructing unit 24 but also on working speed specific to each user, it is not sufficient simply to threshold prediction accuracy calculated based on the processing history information. Therefore, in the present embodiment, the prediction effect evaluating unit 27 is provided to use a quantitative measure taking into account working speed specific to each user measured in the user interface unit 26 as an evaluative criterion of work efficiency, in addition to accuracy of M predictors constructed in the predictor constructing unit 24. As a result, even in the worst case, work efficiency degradation due to a prediction error is prevented, as will be described below.

The user interface unit 26 measures specific working speed based on how much time each user requires for work. Let S denote time required for a user to select from a menu in second per menu and let V denote time required for a user to confirm a recommendation result in second per menu, then S and V can be obtained as follows:

(1) First, in the user interface unit 26, working time is measured without predicted recommendation being presented to a user, the working time without recommendation being denoted by Q in second. The user selects an item on each of M pull down menus 100, thus it takes a total of MS [second]. Therefore, S can be expressed as follows:

$$S=Q/M.$$

(2) Next, working time is measured with predicted recommendation being presented to a user, the working time with recommendation being denoted by R in second. Let K denote the number of recommendations that need user modification, then it takes a total of MV [second] to confirm recommendations, and takes a total of KS [second] to modify, then R can be expressed as follows:

$$R=MV+KS=MV+KQ/M.$$

Then, V can be expressed as follows:

$$V=(MR-KQ)/(M*M).$$

Note that, as values for Q, R, or K, averaged values over two or more measurements may be used.

The working speed specific to each user is output, as a user response result, from the user interface unit 26 to the history database 23 and the prediction effect evaluating unit 27.

The prediction effect evaluating unit 27 calculates work efficiency with predicted recommendation being presented based on parameters that affect performance and time required for work. The prediction effect evaluating unit 27 then thresholds the calculated evaluation index and presents predicted recommendations to a user only when work efficiency is improved with them.

(1) Parameters that Affect Performance (Working Time)

The parameters that affect performance (working time) include:

The number of menus: M
The number of menus: M

One item from each pull down menu 100 is selected. Corresponding to each menu, a total of M predictors are constructed by learning.

Performance of Predictors

Prediction error rate: E ($0 \leq E \leq 1$)

This quantity can be calculated based on processing history information stored in the history database 23. Specifically, current predictors predict each piece of historical data, and then a ratio of error predictions that are different from processing actually performed and recorded in the processing history information to predictions made can be calculated.

Learning time: L [second] per menu

This quantity can be obtained by measuring time required for the predictor constructing unit 24 to learn. As will be described in detail below, because the predictor constructing unit is activated only when a prediction error occurs (see flowchart in FIG. 5), expected total time is EML [second].

Predicting time: P [second] per menu

This quantity can be obtained by measuring time required for the optimal function predicting unit 25 to predict. That is, total predicting time is MP [second].

User Specific Working Speed

User menu selection time: S [second] per menu
Total user menu selection time is MS [second].
User confirmation time: V [second] per menu
Total user confirmation time is MV [second].

(2) Time Required for Work

The working time with and without predicted recommendation being presented to a user are calculated as follows.

Presenting Predicted Recommendations

When predicted recommendations are not presented: $T_0=MS$.

For each menu, a user selects an appropriate item one by one.

When predicted recommendations are presented:

$$T_1=M(P+V+(S+L)E).$$

Prediction→User Confirmation→User Input+Predictor Construction only when a user does not accept a recommendation.

(3) Evaluation Index for Prediction Effect

The work efficiency with predicted recommendation being presented can be calculated as follows:

$$r=T_0/T_1=S/(P+V+(S+L)E).$$

When the term r defined in the equation is greater than one, presenting recommendation improves work efficiency. On the contrary, when the term r is less than one, presenting recommendation degrades work efficiency. By thresholding the evaluation index r, the predicted recommendations are presented to a user only when work efficiency is improved with them.

Figure 5:
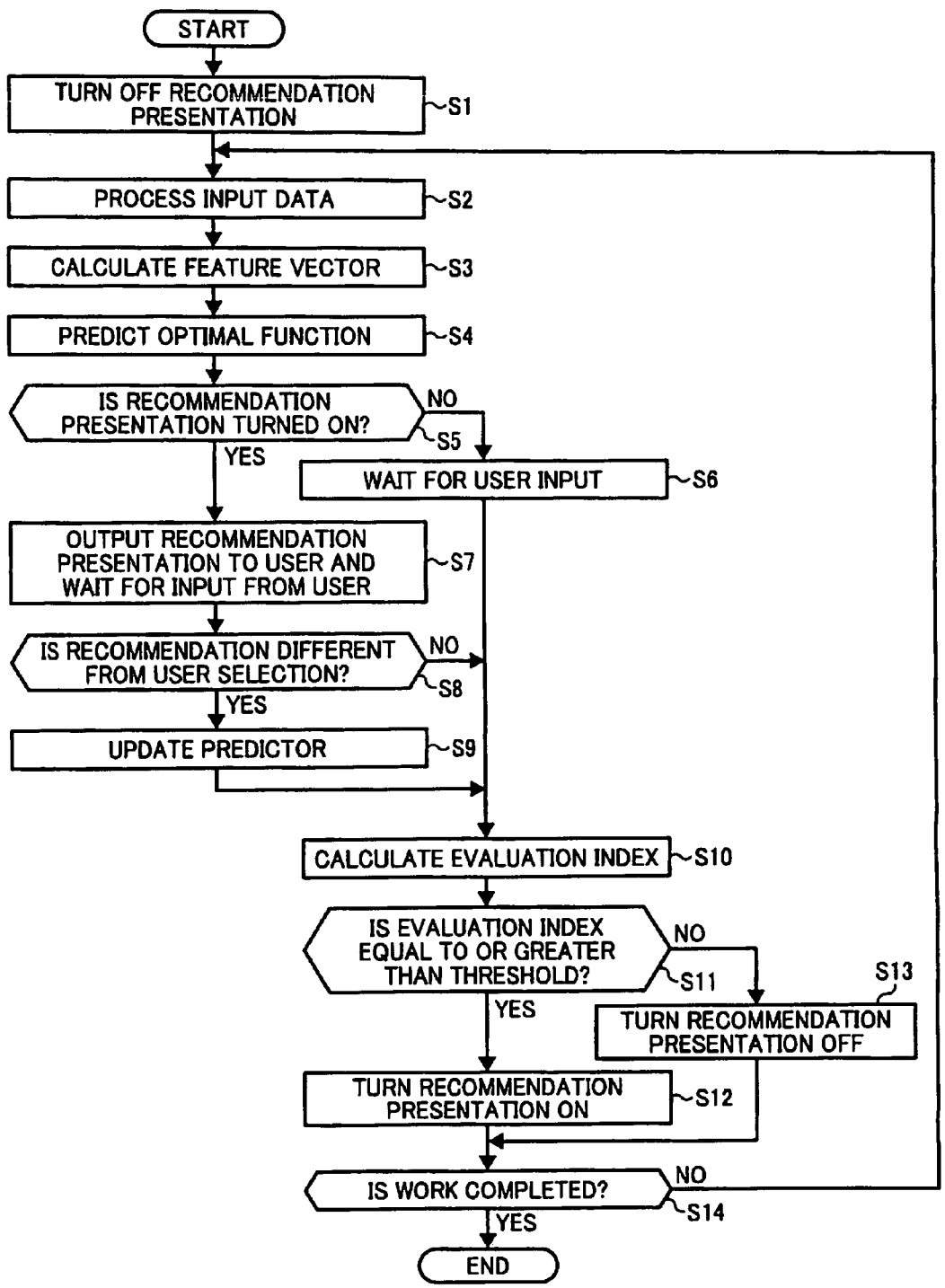
FIG. 5 is a schematic flowchart of data processing performed by the data processing apparatus shown in FIG. 1.

A data processing performed by the data processing apparatus 1 will now be described with reference to a flowchart in FIG. 5. As shown in FIG. 5, the work is started with the optimal function predicting unit 25 turning off a recommendation presentation such as highlighting on the pull down menus 100 (Step S1).

When data is input thereafter, the data input unit 21 preprocesses the input data (Step S2). Then, the feature vector calculating unit 22 calculates the feature vector of the data output from the data input unit 21 and outputs the calculated data to the history database 23 and the optimal function predicting unit 25 (Step S3).

Then, the optimal function predicting unit 25 uses the feature vector as an input and predicts an optimal function (processing) by using M predictors constructed in the predictor constructing unit 24 (Step S4).

In the subsequent Step S5, a determination as to whether the recommendation presentation is turned on is made. When the recommendation presentation is off (NO at Step S5), the user interface unit 26 is ready for receiving a user input of a selection from the M pull down menus 100 presented on the display device 11 (Step S6).

On the other hand, when the recommendation presentation is turned on (YES at Step S5), as shown in FIG. 4, recommendations are presented to a user by highlighting or otherwise emphasizing the item corresponding to a function (processing) predicted as optimal by the optimal function predicting unit 25 on the pull down menu 100. Then M pull down menus are ready to be selected by a user (Step S7).

When a user inputs his/her selection, it is determined if the user selection is different from the recommendation (Step S8).

When the user selection is different from the recommendation (YES at Step S8), the predictor is updated (learned) in the predictor constructing unit 24 based on the user response result stored in the history database 23 (Step S9).

When the predictor is updated (learned) (Step S9), when a user inputs his/her selection (Step S6), or when the user selection is the same as the recommendation (NO at Step S8), the system control proceeds to Step S10 where, based on the user response result transmitted from the user interface unit 26, the prediction effect evaluating unit 27 calculates an evaluation index for prediction effect.

When the evaluation index is equal to or greater than a threshold (YES at Step S11), it is determined that the predictor learning is sufficient and then the recommendation presentation is turned on (Step S12).

When the evaluation index is not equal to or greater than a threshold (NO at Step S11), it is determined that the predictor learning is insufficient and that prediction accuracy thereof is low, and then the recommendation presentation is turned off (Step S13).

If the work is not completed yet (NO at Step S14), the system control returns to Step S2 and waits for another data input.

As described above, the data processing apparatus 1 always predicts optimal processing, but presents predicted results to a user only when the evaluation index calculated in the prediction effect evaluating unit 27 is equal to or greater than a predetermined value, that is, when it is determined that the recommendation improves work efficiency.

How the prediction effect evaluating unit 27 calculates the evaluation index for prediction effect will now be explained. The data processing apparatus 1 has the following performance:

(1) Online learning time L=0.01 [second]: As long as the number of prototypes is equal to or less than 2000, the online learning time is substantially constant irrespective of the number of prototypes within the above range.

(2) Time required for prediction P=0.00 [second]: It takes substantially no time to calculate a prediction. The evaluation index depends on prediction accuracy of the data processing apparatus 1. Time required for a typical user to select from a menu and confirm the selection is:

S=2 to 5 [second], and
V=1 [second], and therefore, the evaluation index can be calculated as:

$$r = S/1 + E(S+0.01).$$

Figure 6:
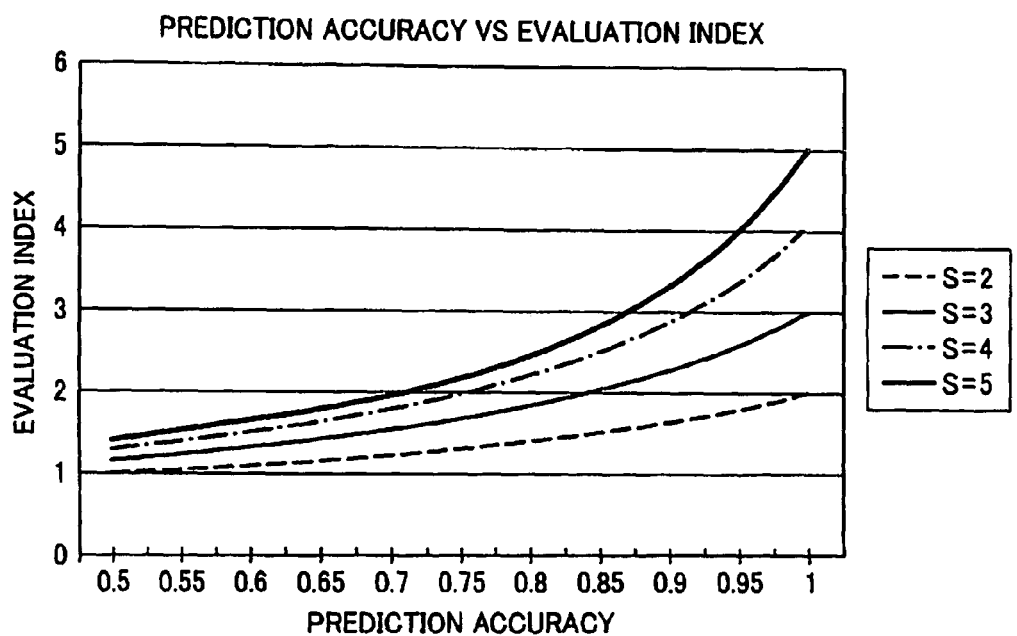
FIG. 6 is a graph of prediction accuracy versus an evaluation index.

Depending on the user specific working time S, the prediction accuracy (1−E) versus the evaluation index will be like a graph shown in FIG. 6. From this graph, the following conclusions can be obtained: a prediction accuracy of about 80% is sufficient to improve work efficiency by a factor of two or more. However, for a fast working user (S=2), the improvement in work efficiency is only slightly better than that without prediction.

While a user performs a sequence of work tasks, the prediction accuracy (1−E(t)) changes over time due to online learning in the optimal function predicting unit 25. A prediction error rate E can be modeled as follows as a function of time t according to the online leaning algorithm in the optimal function predicting unit 25:

$$dE/dt = -\alpha E (\alpha > 0).$$

This equation means that as the number of errors increases, reduction in the prediction error rate E will be large, and that when the number of errors is small, the error rate E will not change. The online learning in the optimal function predicting unit 25 is activated only when a prediction error occurs and the number of prototypes used for learning is constrained to the number located at some fixed short distance from the number of prediction errors. Therefore, the error rate E can be described in the simple differential equation mentioned above.

The prediction error rate E is a convex function as follows:

$$E(t) = E_0 \exp(-\alpha t), \text{ and}$$

$$E_0 = E(0).$$

Figure 7:
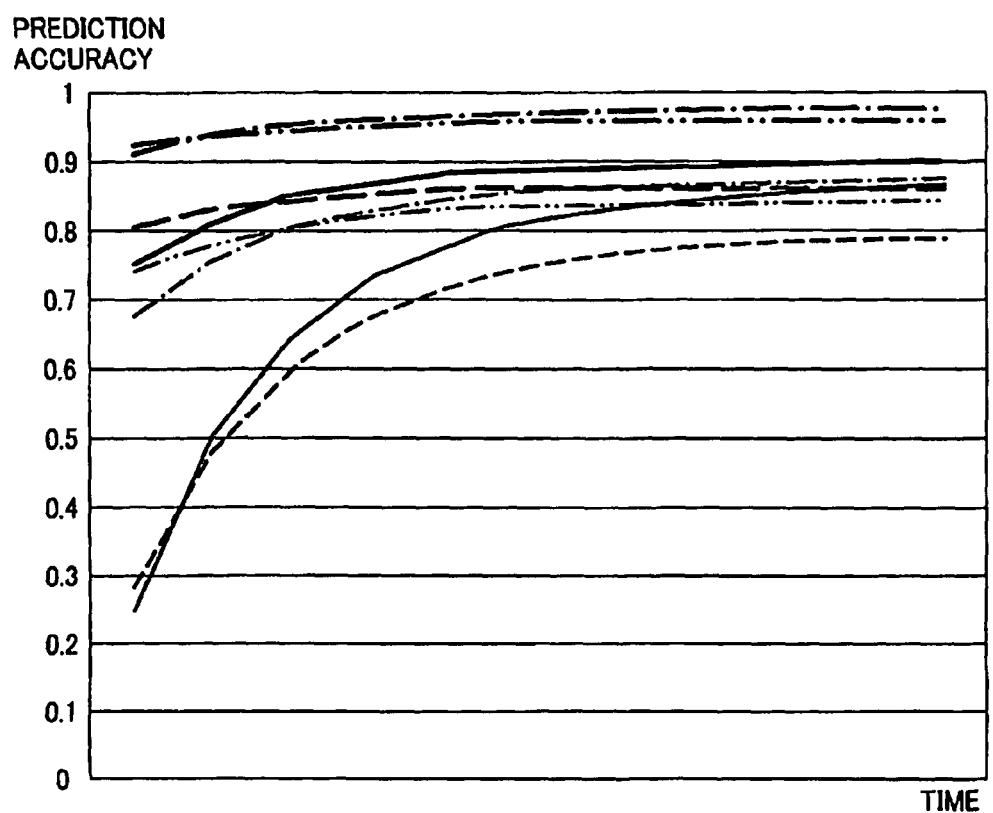
FIG. 7 is a graph of prediction accuracy versus time.

Plotting how the prediction accuracy (1−E(t)) changes based on some experimental results in a concave function 1 of time t, as shown in FIG. 7. In many cases, a prediction accuracy of 80% can be easily achieved.

Therefore, the evaluation index is expressed as follows:

$$r(t) = \frac{S}{P + V + (S+L)\exp(-\alpha t)} \cong \frac{S}{1 + SE_0 \exp(-\alpha t)}.$$

Figure 8:
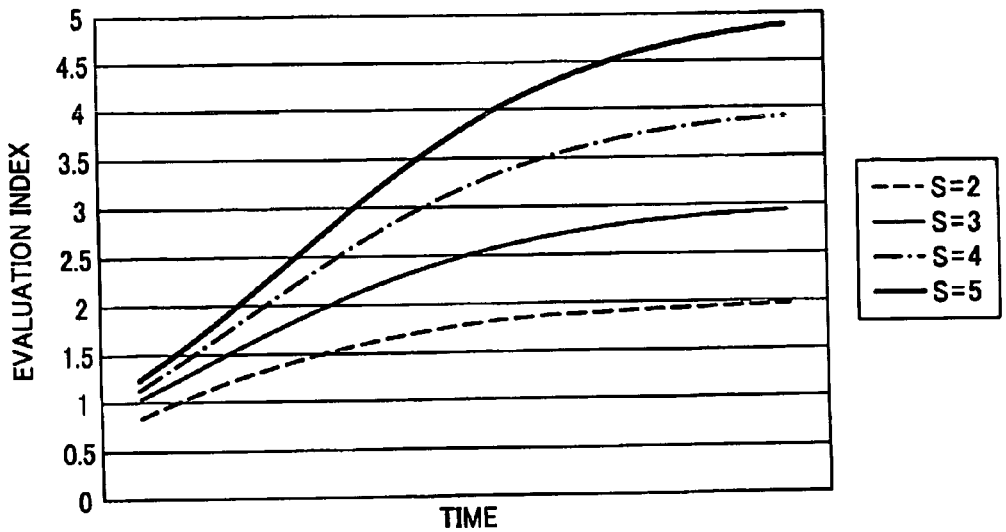
FIG. 8 is a graph of how the evaluation index changes over time.

This expression reveals again that the evaluation index is a concave function of time t, as shown in FIG. 8, meaning that, while a user performs a sequence of work tasks, the efficiency quickly improves.

The analysis using such a simple quantitative model provides the following knowledge.

(1) In the menu selection task, the efficiency improves by a factor of two or more. However, for a fast working user, the improvement in efficiency is only slightly better than that without prediction.

(2) Online learning while a user performs a sequence of work tasks immediately improves the work efficiency.

In this way, according to the present embodiment, the predictors predict optimal processing based on the feature vector of newly input data. Then, the work efficiency with the predicted optimal processing being presented is evaluated. Only when the work efficiency is expected to be improved, the predicted optimal processing is presented to a user. In this way, work efficiency degradation that occurs when a user has to modify the predicted processing one by one due to insufficient learning of the predictors and thus low prediction accuracy can be avoided, resulting in work efficiency improved without failure.

Because the work efficiency depends not only on the predictors' accuracy but also on working speed specific to each user, it is not sufficient simply to threshold the predicting accuracy calculated based on the history. By using not only the predictors' accuracy but also a quantitative measure taking into account working speed specific to each user to evaluate work efficiency, work efficiency degradation due to a prediction error can be prevented even in the worst case.

In addition, in the menu selecting task (in which an operation or a function to be applied to data is selected from a menu), efficiency can be expected to be improved by a factor of two or more. Online learning while a user performs a sequence of work tasks can immediately improve the work efficiency (quick response).

A second embodiment of the present invention will now be described based on FIGS. 9 to 15. Note that, the same components as those described in conjunction with the first embodiment are referenced by the same numerals and thus not explained further.

The first embodiment is described as using the menu selecting task such that processing to be applied to data is specified by selecting an item from the pull down menu 100. The present embodiment is described as using a tagging task such that any number of tags or indexes is attached to data.

Figure 9:
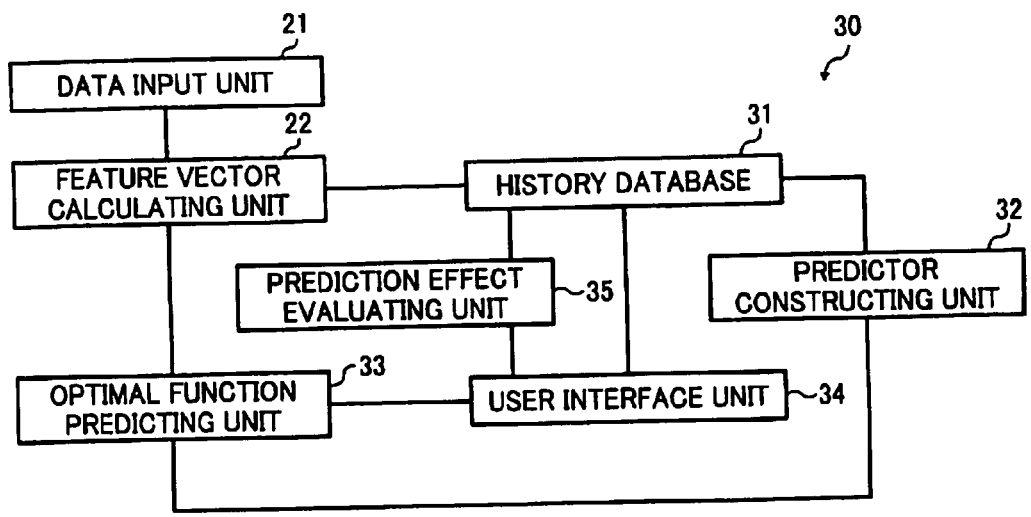
FIG. 9 is a functional block diagram of a data processing apparatus according to a second embodiment of the present invention.

FIG. 9 is a functional block diagram of functions related to data processing performed by the CPU 2 in a data processing apparatus 30 according to the second embodiment of the present invention. As shown in FIG. 9, the data processing apparatus 30 includes the data input unit 21 that receives data input, the feature vector calculating unit 22 that calculates a feature vector of the input data, a history database 31, a predictor constructing unit 32 that constructs a predictor, an optimal function predicting unit 33 that predicts an optimal function, a user interface unit 34 that receives and presents (a) selection(s), and a prediction effect evaluating unit 35 that evaluates a prediction effect. Operations and effects of each of these components will be described in detail below. Note that, the data input unit 21 and the feature vector calculating unit 22 are similar to those described in the first embodiment and thus not explained.

Figure 10:
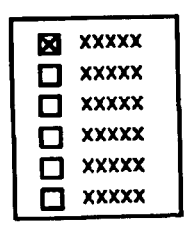
FIG. 10 is an example of a menu having checkboxes.

The user interface unit 34 presents a menu through which a user can select processing (such as an algorithm or a parameter) to be applied to data, on the display device 11, and prompts the user to select processing. As a menu presented on the display device 11 by the user interface unit 34 according to the present embodiment, M possible tags or indexes (word size) are prepared such as a menu with checkboxes 200 as shown in FIG. 10. Note that, when M equals about 100, a tag can be attached by selecting appropriate one from a words list. However, when M is large (substantially equals to the size of a dictionary), a tag is freely entered. In a typical checkbox, a rectangular box is displayed on a screen. A user clicks the rectangular box using the pointing device 13 such as a mouse to toggle between zero and one (0: that word is not used as a tag, 1: that word is used as a tag). When a checkbox is turned on (1: that word is used as a tag), an X mark is displayed in the rectangular box as shown in FIG. 10. Therefore, there are two ways for tagging task depending on the volume of words as described above: one way is to display all words on a screen and let a user select one therefrom using the pointing device 13 and another way is to let a user freely enter (a) word(s) using the keyboard 12.

The history database 31 is formed in the HDD 6 and stores herein processing history information that includes the feature vector output from the feature vector calculating unit 22 and an algorithm or a processing parameter selected by a user through a menu displayed on and output from the user interface unit 34. The processing history information H stored in the history database 31 is expressed as below:

$$H=\{(x(1),\alpha1(1),\alpha1(2),\ldots),(x(2),\alpha2(1),\alpha2(2),\ldots),\ldots\}$$

where x(k) is the feature vector extracted from kth piece of data, and αk(•) is a tag attached to kth piece of data. In the history database 31, these are recorded in time series.

The predictor constructing unit 32 constructs predictors by learning with data stored in the history database 31. The predictor constructing unit 32 in the present embodiment constructs two-class predictors that perform binary determination in each of a total of M tags or indexes (each word), prepared by the user interface unit 34, by learning in conjunction with an identifying algorithm used in the optimal function predicting unit 33.

The optimal function predicting unit 33 receives the feature vector output from the feature vector calculating unit 22 and predicts an optimal function (algorithm or processing parameter) using M predictors constructed in the predictor constructing unit 32. The optimal function predicting unit 33 can supply the feature vector output from the feature vector calculating unit 22 to the predictors that use any identifying algorithm and output a class (that corresponds to an algorithm or a processing parameter) to be recommended as a function (processing) predicted as optimal. The identifying algorithm includes, for example, the nearest identification, a neural network, and a support vector machine.

Figure 11:
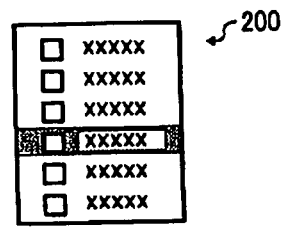
FIG. 11 is an example of highlighting an item in the menu shown in FIG. 10.

When the optimal function predicting unit 33 outputs the function (processing) predicted as optimal, the user interface unit 34 presents, as shown in FIG. 11, the recommended tag to a user by, for example, highlighting or otherwise emphasizing an item corresponding to a function (processing) predicted as optimal on the menu with checkboxes 200. A user indicates whether he/she accepts the function (processing) predicted as optimal by using the pointing device 13 such as a mouse. For example, if a user does not accept the function (processing) predicted as optimal, he/she can reselect other processing or parameter from the menu by using the pointing device 13 such as a mouse. The user response result is output from the user interface unit 34 to the history database 31 and the prediction effect evaluating unit 35.

The prediction effect evaluating unit 35 introduces an evaluation index for prediction effect in terms of user work efficiency when a user selects an operation or a function to be applied to the data from the menu with checkboxes 200 as described above.

Because the work efficiency depends not only on accuracy of M two-class predictors performing binary determination and constructed in the predictor constructing unit 32 but also on working speed specific to each user, it is not sufficient simply to threshold prediction accuracy calculated based on the processing history information. Therefore, in the present embodiment, the prediction effect evaluating unit 35 is provided to use a quantitative measure taking into account working speed specific to each user measured in the user interface unit 34, in addition to accuracy of M two-class predictors performing binary determination and constructed in the predictor constructing unit 32 as an evaluative criterion of work efficiency. As a result, even in the worst case, work efficiency degradation due to a prediction error is prevented, as will be described below.

The user interface unit 34 measures specific working speed based on how much time each user requires for work.

(1) First, in the user interface unit 34, working time is measured without predicted recommendation being presented to a user, the working time with recommendation being denoted by S in second.

(2) Next, working time is measured with predicted recommendation being presented to a user. Let V denote time in second required for a user to confirm a recommendation result and let C denote time in second per word required for a user to modify, then V and C can be obtained as follows. The working time and the number of predictions that need to be modified by a user are measured, the working time and the number being denoted by R(j) in second and K(j) (where j=1, 2), respectively. Then, it takes V seconds to confirm a recommendation result and K(j)·C [second], therefore R(1) and R(2) can be expressed as follows:

$$R(1)=V+K(1)\cdot C,\text{ and}$$

$$R(2)=V+K(2)\cdot C.$$

V and C can be determined by satisfying these two equations simultaneously in terms of two unknowns V and C.

Note that, for values of V and C, a least squares solution obtained from over-constrained simultaneous equations (where the number of variables is larger than that of equations) based on R(j) seconds and K(j) measured for three or more pieces of data may be used.

The working speed specific to each user is output, as a user response result, from the user interface unit 34 to the history database 31 and the prediction effect evaluating unit 35.

The prediction effect evaluating unit 35 calculates work efficiency with predicted recommendation being presented based on parameters that affect performance and time required for work. The prediction effect evaluating unit 35 then thresholds the calculated evaluation index and presents predicted recommendations to a user only when work efficiency is improved with them.

(1) Parameters that Affect Performance (Working Time)

The parameters that affect performance (working time) include:

Performance of Predictors

Prediction error rate: E ($0 \leq E \leq 1$)

This quantity can be calculated based on processing history information stored in the history database 31. Specifically, current predictors predict each piece of historical data, and then a ratio of error predictions that are different from tags actually attached and recorded in the processing history information to predictions can be calculated.

Learning time: L [second] per word

This quantity can be obtained by measuring time required for the predictor constructing unit 32 to learn. As will be described in detail below, because the predictor constructing unit is activated only when a prediction error occurs (see the flowchart in FIG. 12), expected total time is EML [second].

Predicting time: P [second] per word

This quantity can be obtained by measuring time required for the optimal function predicting unit 33 to predict. That is, total predicting time is MP [second].

User Specific Working Speed

Without predicted recommendation being presented

Tag selection time: S [second]

With predicted recommendation being presented

User confirmation time: V [second]

User modification time: C [second] per word (2) Time Required for Work

The working time with and without predicted recommendation being presented to a user are calculated as follows.

Presenting Predicted Recommendations

When predicted recommendations are not presented:

$$T_0 = S$$

A user inputs tags (selected from a words list or entered freely).

When predicted recommendations are presented:

$$T_1 = MP + V + EM(C+L)$$

Prediction→User Confirmation→User Modification+Predictor Construction only when a user does not accept a recommendation.

(3) Evaluation Index for Prediction Effect

The work efficiency with predicted recommendation being presented can be calculated as follows:

$$r = T_0/T_1 = S/(MP+V+EM(C+L)).$$

When the term r defined in the equation is greater than one, presenting recommendation improves work efficiency. On the contrary, when the term r is less than one, presenting recommendation degrades work efficiency. By thresholding the evaluation index r, the predicted recommendations are presented to a user only when work efficiency is improved with them.

Figure 12:
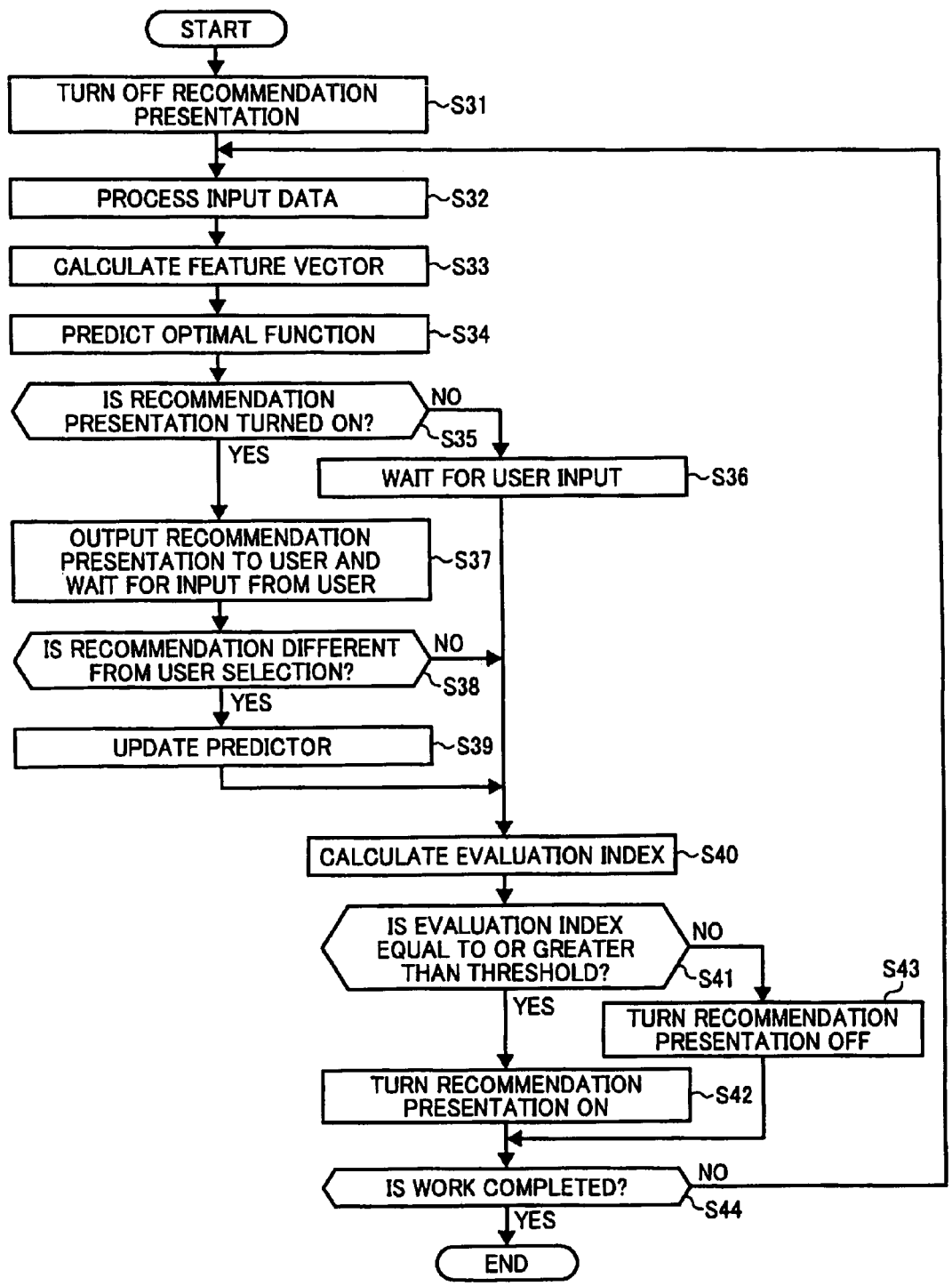
FIG. 12 is a schematic flowchart of data processing performed by the data processing apparatus shown in FIG. 9.

A data processing flow will now be described with reference to a flowchart in FIG. 12. As shown in FIG. 12, the work is started with the optimal function predicting unit 33 turning off a recommendation presentation such as highlighting on the menu with checkboxes 200 (Step S31).

When data is input thereafter, the data input unit 21 preprocesses the input data (Step S32). Then, the feature vector calculating unit 22 calculates the feature vector of the data output from the data input unit 21 and outputs the calculated data to the history database 31 and the optimal function predicting unit 33 (Step S33).

Then, the optimal function predicting unit 33 uses the feature vector output from the feature vector calculating unit 22 as an input to predict an optimal function (processing) by using M predictors constructed in the predictor constructing unit 32 (Step S34).

In the following Step S35, a determination as to whether the recommendation presentation is turned on is made. When the recommendation presentation is turned off (NO at Step S35), the user interface unit 34 is ready for receiving a user input of a selection from the M tags or indexes on the menu with checkboxes 200 presented on the display device 11 (Step S36).

On the other hand, when the recommendation presentation is turned on (YES at Step S35), as shown in FIG. 11, recommendations are presented to a user by highlighting or otherwise emphasizing the item corresponding to a function (processing) predicted as optimal by the optimal function predicting unit 33 on the menu with checkboxes 200. Then M tags or indexes on the menu with checkboxes 200 are ready to be selected by a user (Step S37).

When a user inputs his/her selection, it is determined if the user selection is different from the recommendation (Step S38).

When the user selection is different from the recommendation (YES at Step S38), the predictor is updated (learns) in the predictor constructing unit 32 based on the user response result stored in the history database 31 (Step S39).

When the predictor is updated (learns) (Step S39), when a user inputs his/her selection (Step S36), or when the user selection is the same as the recommendation (NO at Step S38), the flow proceeds to Step S40 where based on the user response result transmitted from the user interface unit 34, the prediction effect evaluating unit 35 calculates an evaluation index for prediction effect.

When the evaluation index is equal to or greater than a threshold (YES at Step S41), it is determined that the predictor learning is sufficient and then the recommendation presentation is turned on (Step S42).

When the evaluation index is not equal to or greater than a threshold (NO at Step S41), it is determined that the predictor learning is insufficient and that prediction accuracy thereof is low, and then the recommendation presentation is turned off (Step S43).

If the work is not completed yet (NO at Step S44), the flow returns to Step S32 and waits for another data input.

As described above, the data processing apparatus 30 always predicts optimal processing, but presents predicted results to a user only when the evaluation index calculated in the prediction effect evaluating unit 35 is equal to or greater than a predetermined value, that is, when it is determined that the recommendation improves work efficiency.

How the prediction effect evaluating unit 35 in the data processing apparatus 30 as constructed above calculates the evaluation index for prediction effect will now be shown. The data processing apparatus 30 has the following performance.

(1) Online learning time L=0.01 [second]: As long as the number of prototypes is equal to or less than 2,000, the online learning time is substantially constant irrespective of the number of prototypes within the above range.

(2) Time required for prediction P=0.00 [second]: It takes substantially no time to calculate a prediction. The evaluation index depends on prediction accuracy of the data processing apparatus 30. Working time S without the predicted recommendation being presented to a user and time V required for a user to confirm the recommendation result depend on each user and tag inputting method (selecting a tag from a words list or entering a tag freely).

First, a method for selecting a tag from a list (M<100) will be described. It is assumed that S and V depend on the volume M of words. Using parameters a (for the tag selecting operation) and b (for the confirming operation) that denote working speed specific to each user, S, V, and C are expressed as follows:

$$S = aM,$$

$$V = bM (a<b), \text{ and}$$

$$C = 1.0.$$

Then, the evaluation index is expressed as follows:

$$r = \frac{aM}{bM + EM(1+0.01)} \cong \frac{a}{b+E}$$

where a value of "a" typically ranges from about 0.5 to 1.2. That is, time required for such an operation that a user selects appropriate a plurality of words from a list including 50 words ranges from about 25 to 60 seconds. It is assumed that a value of "b" is proportional to a value of "a" according to, for example, b=0.5a (that corresponds to the time required for a user to confirm on or off of about 12 to 30 seconds when there are 50 items). Then, depending on the parameter "a" that is specific to each user, the relationship between the prediction accuracy (1−E) and the evaluation index is as shown in a graph in FIG. 13.

Figure 13:
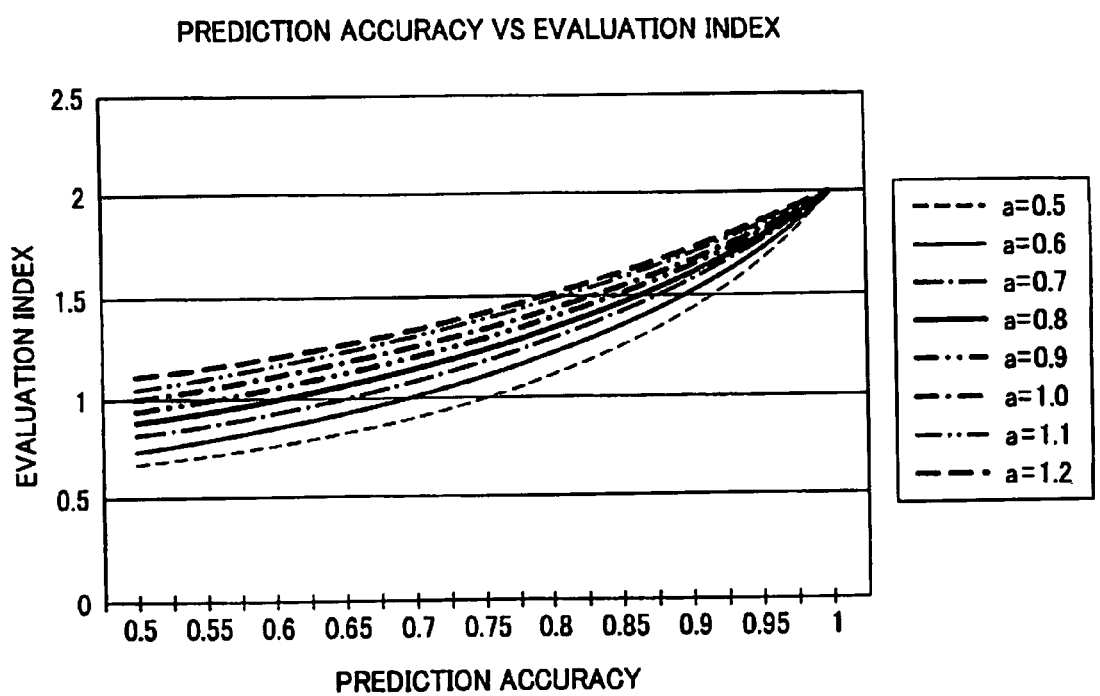
FIG. 13 is a graph of prediction accuracy versus an evaluation index.
Figure 14:
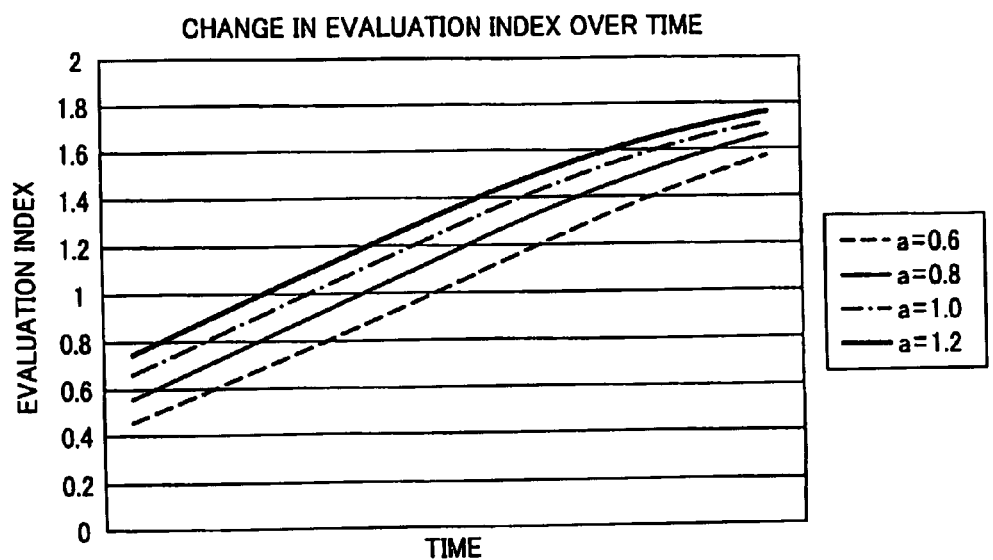
FIG. 14 is a graph of how the evaluation index changes over time.

From the graph shown in FIG. 13, the following conclusions can be obtained: in the task where a user selects one or more tags from a words list, a prediction accuracy of about 85% is sufficient to improve work efficiency by a factor of 1.5 or more. However, for a fast working user, improvement in work efficiency is only slightly better than that without prediction, and prediction accuracy that is equal to or less than 70% degrades work efficiency.

The prediction error rate E is a convex function as follows:

$$E(t) = E_0 \exp(-\alpha t), \text{ and}$$

$$E_0 = E(0).$$

Therefore, how the evaluation index changes over time is expressed as follows:

$$r(t) = \frac{a}{b + E_0 \exp(-\alpha t)}.$$

This function is a concave function in terms of time t from a broad view and changes such that r(t) increases quickly earlier in time, but as time elapses, r(t) saturates. However, from a graph shown in FIG. 14, r(t) changes substantially linearly in the actually meaningful time period.

The task where tags are freely entered (M substantially equals to the size of a dictionary) will now be described. When the volume M of words is as large as a dictionary, and thus tags are freely entered, S and V do not depend on M. Rather, S and V depend on quality of data to be processed, and therefore analysis is difficult. As with the analysis above, S and V are expressed as follows as average values of user specific working time:

$$V = 0.5S, \text{ and}$$

$$C = 1.0.$$

Then, the evaluation index is expressed as follows:

$$r = \frac{S}{0.5S + EM(1+0.01)} \cong \frac{1}{0.5 + \frac{EM}{S}}.$$

Figure 15:
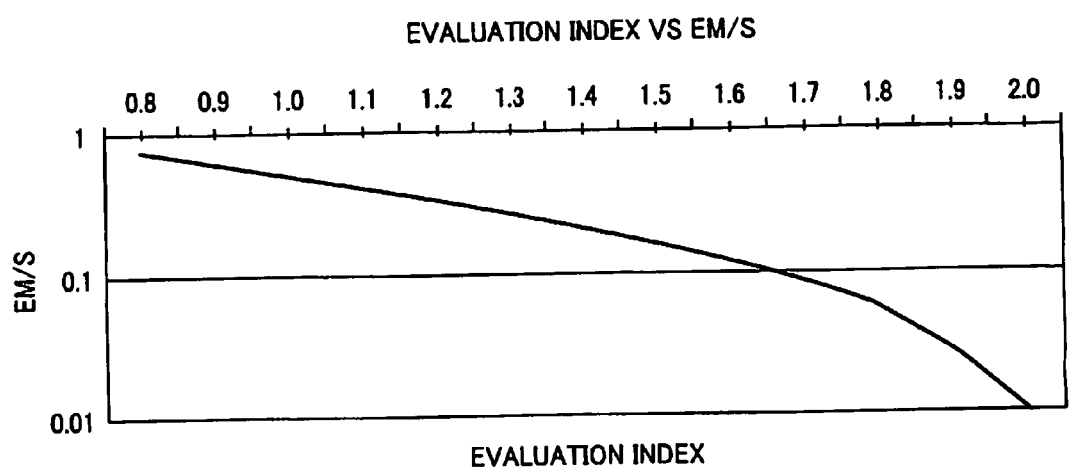
FIG. 15 is a graph of the evaluation index versus EM/S.

Then, a relationship between EM/S and the evaluation index is as shown in a graph in FIG. 15. As shown in the graph in FIG. 15, the evaluation index is equal or larger than 1.7 under the condition of EM/S is smaller than 0.1. If S is assumed to be 30 seconds, then EM is smaller than 3. In addition, because M is large (at least 100), improvement in work efficiency is achieved with E being less than 0.03, which corresponds to a prediction accuracy of 97% or more. Therefore, in the task where tags are freely entered, work efficiency is not improved unless the accuracy reaches almost 100%.

The analysis using such a simple quantitative model provides the following knowledge.

(1) In the task where a user selects one or more tags from a words list, a prediction accuracy of about 85% is sufficient to improve work efficiency by a factor of 1.5 or more. However, for a fast working user, the improvement in work efficiency is only slightly better than that without prediction, and prediction accuracy that is equal to or less than 70% degrades work efficiency.

(2) In the task where a tag is freely entered, work efficiency is not improved unless the accuracy reaches almost 100%.

In this way, according to the present embodiment, the predictors predict optimal processing based on the feature vector of newly input data. Then, the work efficiency of the predicted optimal processing is evaluated. Only when the work efficiency is expected to be improved, the predicted optimal processing is presented to a user. Consequently, work efficiency degradation that occurs when a user has to modify the predicted processing one by one due to insufficient learning of the predictors and thus low prediction accuracy can be avoided, resulting in work efficiency improved without failure consistently.

Because the work efficiency depends not only on the predictors' accuracy but also on working speed specific to each user, it is not sufficient simply to threshold the predicting accuracy calculated based on the history. By using not only the predictors' accuracy but also a quantitative measure taking into account working speed specific to each user to evaluate work efficiency, work efficiency degradation due to a prediction error can be prevented even in the worst case.

In the tagging task (where a plurality of tags are attached to data), if tags are selected from a words list, a prediction accuracy of about 85% is sufficient to improve work efficiency by a factor of 1.5 or greater. If tags are entered freely, a prediction accuracy of almost 100% is required to improve work efficiency.

A third embodiment of the present invention will now be described based on FIG. 16. Note that, the same components as those described in conjunction with the first or the second embodiment are referenced by the same numerals and thus not explained further.

While, in the first and the second embodiments, the data processing apparatuses 1 and 30 are described as a computer such as a PC, in the present embodiment, the data processing apparatuses 1 and 30 are described as an information processing apparatus such as being included in a digital multifunction product.

Figure 16:
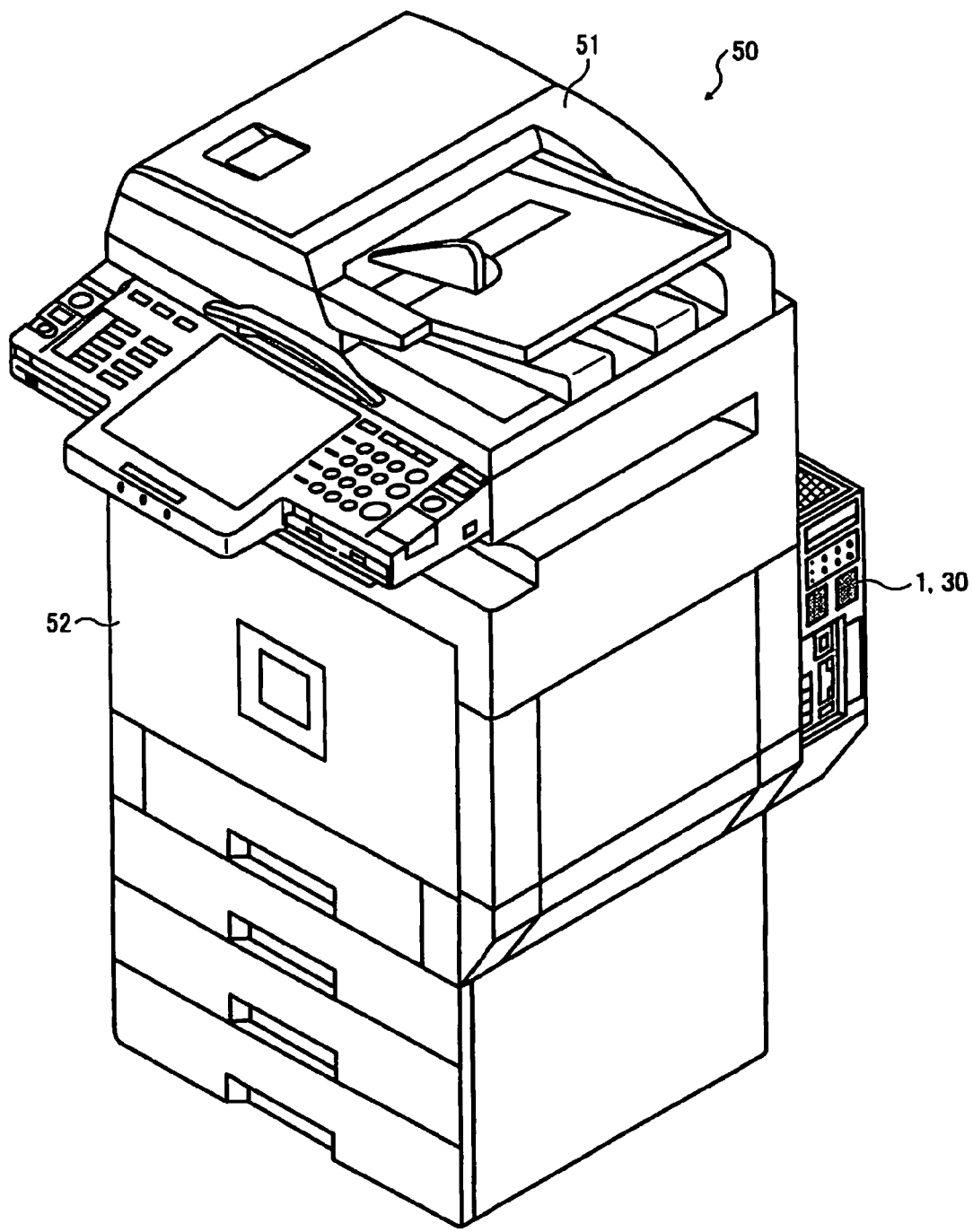
FIG. 16 is an external perspective view of a digital multifunction product according to a third embodiment of the present invention.

FIG. 16 is an external perspective view of a digital multifunction product 50 according to the third embodiment of the present invention. As shown in FIG. 16, the data processing apparatuses 1 and 30 take form of an information processing apparatus that is included in the digital multifunction product 50. The digital multifunction product 50 is an image forming device including a scanner unit 51 that captures images and a printer unit 52 that prints images. The scanned image that is captured by the scanner unit 51 in the digital multifunction product 50 is then processed in the image processing apparatus.

A forth embodiment of the present invention will be described based on FIG. 17. Note that, the same components as those described in conjunction with the first or the second embodiment are referenced by the same numerals and thus not explained further.

While, in the first and the second embodiments, the data processing apparatuses 1 and 30 are described as a local system (for example, a stand-alone personal computer), in the present embodiment, the data processing apparatuses 1 and 30 are described as a server computer that constitutes a server-client system.

Figure 17:
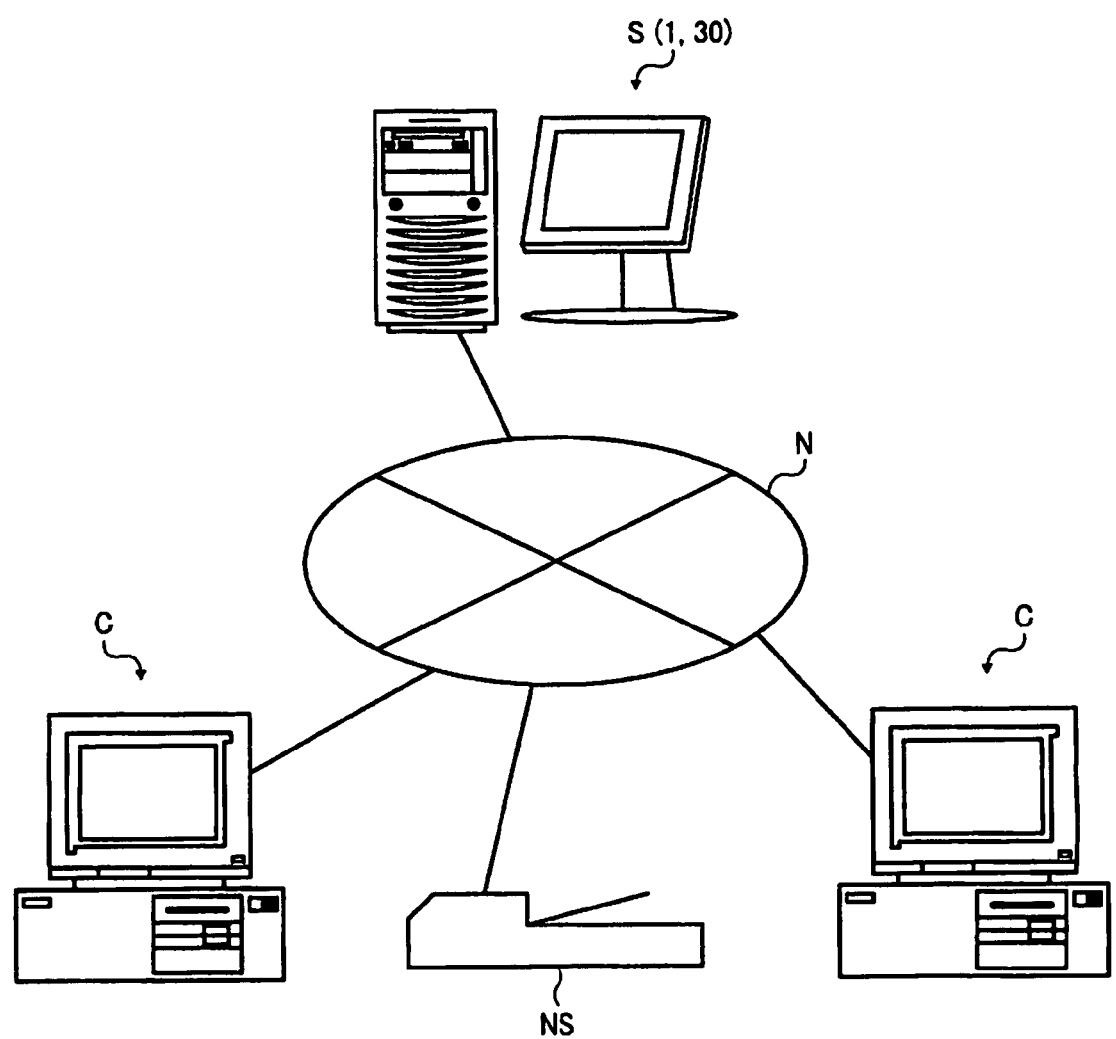
FIG. 17 is a schematic view of a server-client system according to a forth embodiment of the present invention.

FIG. 17 is a schematic view of a server-client system according to the forth embodiment of the present invention. As shown in FIG. 17, in the server-client system, the server computer S is connected to a plurality of client computers C via a network N. The server computer S (the data processing apparatuses 1 and 30) receives images from each client computer C and processes the received images. In addition, a network scanner NS is provided on the network N.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus comprising:
an input unit configured to receive input of data;
a calculating unit configured to calculate a feature vector of data input through the input unit;
a selection receiving unit configured to present processing options to a user and receive a user selection from the processing options;
a storing unit configured to store processing history information in a history database, the processing history information including feature vectors calculated by the calculating unit and user selections received via the selection receiving unit in a time series manner;
a predictor constructing unit configured to construct a predictor for an identifying algorithm that predicts optimal processing for input data based on processing history information stored in a history database;
an optimal function predicting unit configured to predict optimal processing based on a feature vector calculated by the calculating unit of new data input via the input unit by using the predictor;
an evaluating unit configured to evaluate work efficiency for the optimal processing predicted by the optimal function predicting unit, wherein the evaluating unit is configured to evaluate work efficiency for the optimal processing predicted by the optimal function predicting unit based on a prediction accuracy of the predictor and a user specific working time that is required for each user to select one of the processing options with the selection receiving unit; and
a presenting unit configured to present the optimal processing predicted by the optimal function predicting unit to the user when an evaluation result obtained by the evaluating unit is equal to or greater than a threshold.

2. The data processing apparatus according to claim 1, wherein the selection receiving unit is configured to present the processing options in a menu selection task that allows the user to select one item from among a plurality of items in a menu to specify the user selection.

3. The data processing apparatus according to claim 2, wherein the prediction accuracy of the predictor is a ratio of the processing predicted and stored as the processing history information in the history database, the processing being not actually performed, to all the predicted processing.

4. The data processing apparatus according to claim 2, wherein the evaluating unit is configured to evaluate the work efficiency r for the optimal processing predicted by the optimal function predicting unit according to the following equation:

$$r=S/(P+V+(S+L)E)$$

where
S is time taken by the user to select an item,
P is time taken by the optimal function predicting unit to perform prediction,
V is time taken by the user for confirmation,
L is time required for constructing the predictor in the predictor constructing unit, and
E is a prediction error rate.

5. The data processing apparatus according to claim 1, wherein the selection receiving unit is configured to present the processing options in a tagging task in which a desired tag or an index is attached to the data.

6. The data processing apparatus according to claim 5, wherein the prediction accuracy of the predictor is a ratio of the tags or indexes predicted and stored as the processing history information in the history database that are not actually attached to the data to all the predicted tags or indexes.

7. The data processing apparatus according to claim 5, wherein the evaluating unit is configured to evaluate the work efficiency r for the optimal processing predicted by the optimal function predicting unit according to the following equation:

$$r=S/(MP+V+EM(C+L))$$

where
S is time taken by the user to select an item,
M is number of tags or indexes,
P is time taken by the optimal function predicting unit to perform prediction,
V is time taken by the user for confirmation,
C is time taken by the user to perform modification,
L is time required for constructing the predictor in the predictor constructing unit, and
E is a prediction error rate.

8. The data processing apparatus according to claim 1, wherein the presenting unit is configured to present the optimal processing predicted by the optimal function predicting unit in a highlighted manner.

9. A data processing method comprising:
receiving input of data;
calculating a feature vector of data received at the receiving;
selection receiving including presenting processing options to a user and receiving a user selection from the processing options;
storing processing history information in a history database, the processing history information including feature vectors calculated by the calculating unit and user selections received via the selection receiving in a time series manner;

constructing a predictor for an identifying algorithm that predicts optimal processing for input data based on processing history information stored in a history database;

predicting optimal processing based on a feature vector calculated at the calculating of new data received at receiving by using the predictor;

evaluating work efficiency for the optimal processing predicted at the predicting, wherein the evaluating includes evaluating work efficiency for the optimal processing predicted at the predicting based on a prediction accuracy of the predictor and a user specific working time that is required for each user to select one of the processing options at the selection receiving; and presenting the optimal processing predicted at the predicting to the user when an evaluation result obtained at the evaluating is equal to or greater than a threshold.

10. The data processing method according to claim 9, wherein the selection receiving includes presenting the processing options in a menu selection task that allows the user to select one item from among a plurality of items in a menu to specify the user selection.

11. The data processing method according to claim 10, wherein the prediction accuracy of the predictor is a ratio of the processing predicted and stored as the processing history information in the history database, the processing being not actually performed, to all the predicted processing.

12. The data processing method according to claim 10, wherein the evaluating includes evaluating the work efficiency r for the optimal processing predicted at the predicting according to the following equation:

$$r = S/(P+V+(S+L)E)$$

where
S is time taken by the user to select an item,
P is time taken by the optimal function predicting unit to perform prediction,
V is time taken by the user for confirmation,
L is time required for constructing the predictor in the predictor constructing unit, and
E is a prediction error rate.

13. The data processing method according to claim 9, wherein the selection receiving includes presenting the processing options in a tagging task in which a desired tag or an index is attached to the data.

14. The data processing method according to claim 13, wherein the prediction accuracy of the predictor is a ratio of the tags or indexes predicted and stored as the processing history information in the history database that are not actually attached to the data to all the predicted tags or indexes.

15. The data processing method according to claim 13, wherein the evaluating includes evaluating the work efficiency r for the optimal processing predicted at the predicting according to the following equation:

$$r = S/(MP+V+EM(C+L))$$

where
S is time taken by the user to select an item,
M is number of tags or indexes,
P is time taken by the optimal function predicting unit to perform prediction,
V is time taken by the user for confirmation,
C is time taken by the user to perform modification,
L is time required for constructing the predictor in the predictor constructing unit, and
E is a prediction error rate.

16. The data processing method according to claim 9, wherein the presenting includes presenting the optimal processing predicted at the predicting in a highlighted manner.

17. A computer program product having a non-transitory computer readable storage medium including a plurality of computer executable instructions for performing data processing, the instructions causing a computer to execute:

receiving input of data;

calculating a feature vector of data received at the receiving;

selection receiving including presenting processing options to a user and receiving a user selection from the processing options;

storing processing history information in a history database, the processing history information including feature vectors calculated by the calculating unit and user selections received via the selection receiving in a time series manner;

constructing a predictor for an identifying algorithm that predicts optimal processing for input data based on processing history information stored in a history database;

predicting optimal processing based on a feature vector calculated at the calculating of new data received at receiving by using the predictor;

evaluating work efficiency for the optimal processing predicted at the predicting, wherein the evaluating includes evaluating work efficiency for the optimal processing predicted at the predicting based on a prediction accuracy of the predictor and a user specific working time that is required for each user to select one of the processing options at the selection receiving; and presenting the optimal processing predicted at the predicting to the user when an evaluation result obtained at the evaluating is equal to or greater than a threshold.

* * * * *